Feb. 9, 1932.  S. F. WEBB  1,843,938
APPARATUS FOR LEVELING LAND AND FORMING BORDERS
Filed Jan. 28, 1930  3 Sheets-Sheet 1
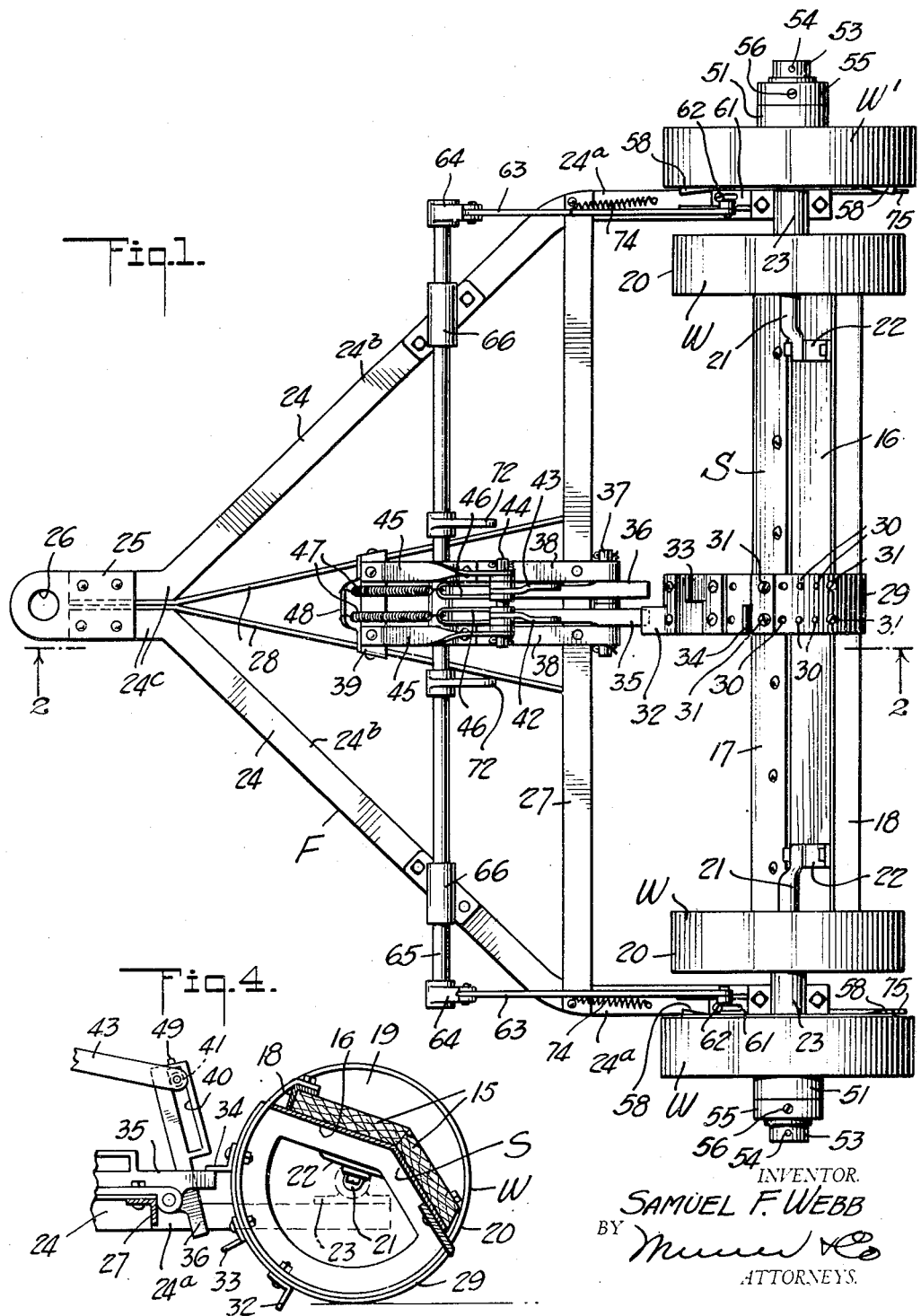
INVENTOR.
SAMUEL F. WEBB
BY
ATTORNEYS.

Feb. 9, 1932.  S. F. WEBB  1,843,938
APPARATUS FOR LEVELING LAND AND FORMING BORDERS
Filed Jan. 28, 1930  3 Sheets-Sheet 2
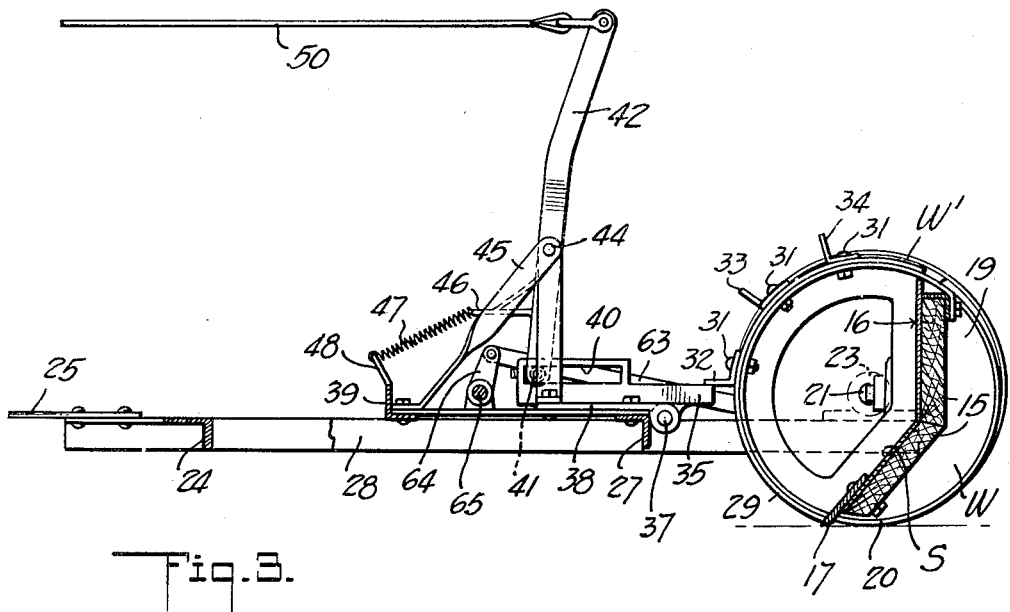
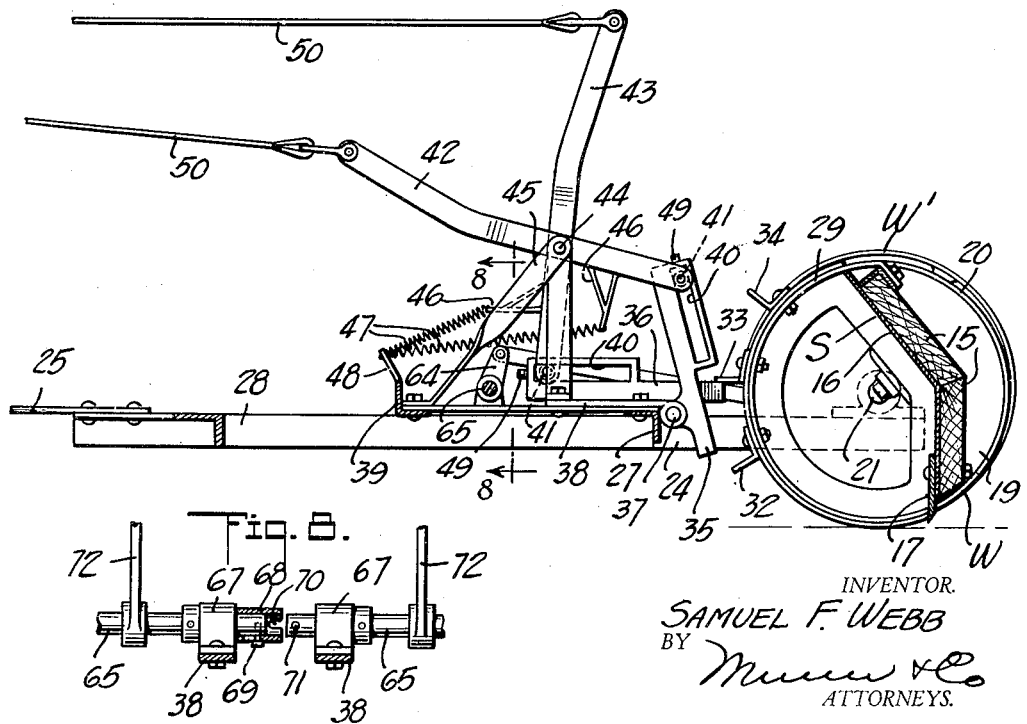
INVENTOR.
SAMUEL F. WEBB Feb. 9, 1932. S. F. WEBB 1,843,938
APPARATUS FOR LEVELING LAND AND FORMING BORDERS
Filed Jan. 28, 1930 3 Sheets-Sheet 3
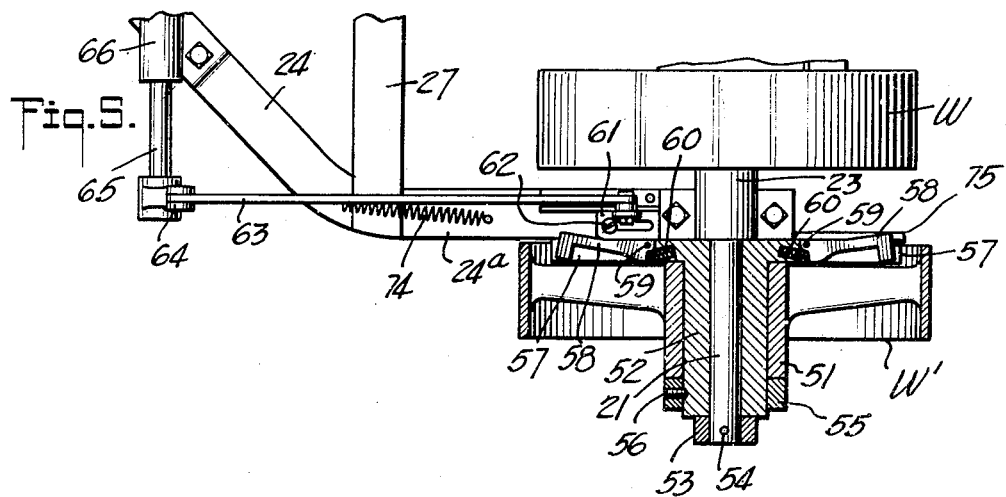
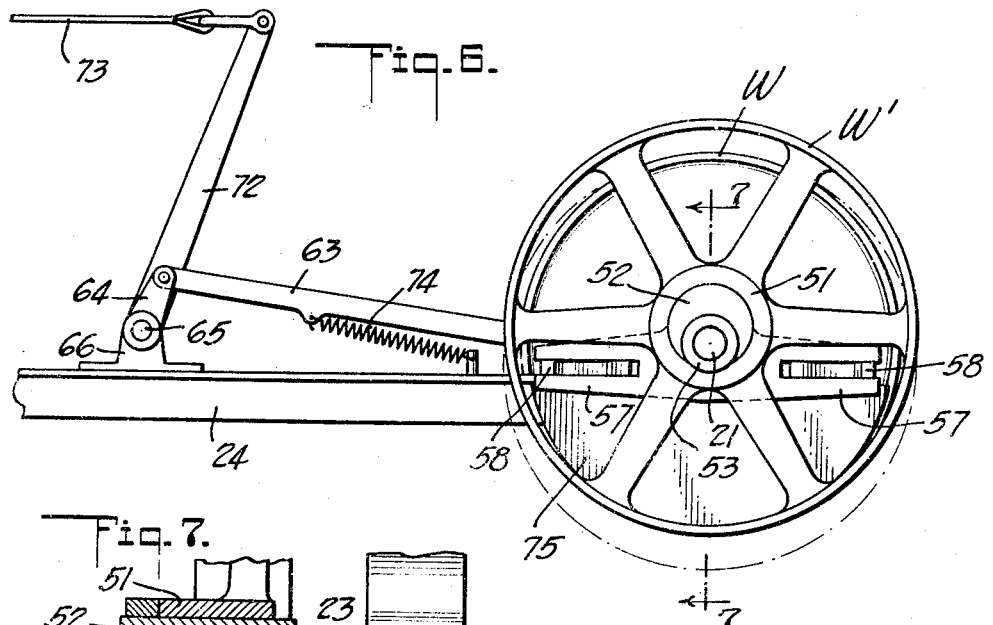
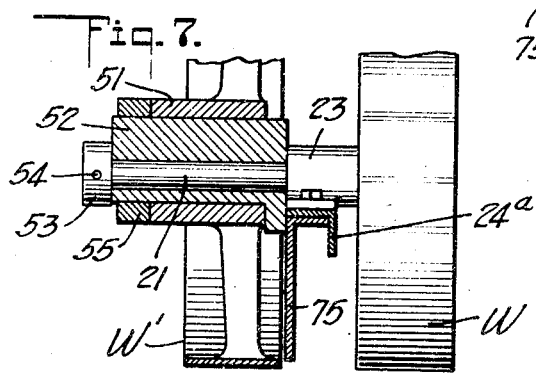
INVENTOR.
SAMUEL F. WEBB
BY
ATTORNEYS.

Patented Feb. 9, 1932

1,843,938

UNITED STATES PATENT OFFICE

SAMUEL F. WEBB, OF HOLTVILLE, CALIFORNIA

APPARATUS FOR LEVELING LAND AND FORMING BORDERS

Application filed January 28, 1930. Serial No. 424,010.

My invention relates to and has for a purpose the provision of a wheeled apparatus by which farm land of irregular topography may be, subsequent to being plowed or harrowed, leveled with facility and dispatch to the end of facilitating uniform irrigation, the apparatus also being capable of operation to form borders for confining the water as distributed to a predetermined area of land.

I will describe only one form of apparatus for leveling land and forming borders embodying my invention, and will then point out the novel features thereof in claims.

In the accompanying drawings:

Fig. 1 is a view showing in top plan one form of apparatus embodying my invention.

Fig. 2 is a vertical sectional view taken on the line 2—2 of Fig. 1.

Fig. 3 is a view similar to Fig. 2 showing the scoop of the apparatus in a different position of adjustment from that illustrated in Fig. 2.

Fig. 4 is a fragmentary vertical sectional view illustrating a third position of adjustment of the scoop of the apparatus.

Fig. 5 is a fragmentary and enlarged plan view, partly in section, and illustrating the mechanism for controlling actuation of one of the elevating wheels of the apparatus.

Fig. 6 is a fragmentary view showing in side elevation that part of the apparatus illustrated in Fig. 5.

Fig. 7 is a vertical sectional view taken on the line 7—7 of Fig. 6.

Fig. 8 is a vertical sectional view taken on the line 8—8 of Fig. 3, and looking in the direction of the arrows.

Similar reference characters refer to similar parts in each of the several views.

In carrying out my invention, I provide a scoop designated generally at S, and which scoop comprises a pair of angularly positioned boards 15 covered at their front sides by a sheet of metal 16, and with a scraping blade 17 at the lower edge of the sheet 16 so as to project beyond the lower edge of the lower board 15. By means of angle bars 18 the boards 15 and the metal sheet 16 are secured at their ends to metal disks 19, these disks forming parts of a pair of main wheels W, the remainder of the wheels being made up of rims 20 secured to the periphery of the disks 19.

Stub shafts 21 extend through the disks 19 with their inner ends secured to brackets 22 fixed to the metal sheet 16, while their outer portions are journaled in bearings 23 carried by a draft frame designated generally at F. In this manner, the wheels W together with the scoop S are mounted for rotative movement on the draft frame for the purpose of permitting the scoop to occupy various positions of adjustment in order that it may function to collect, distribute, and discharge the earth over which it is adapted to be moved when in operation to the end of leveling the earth and forming borders.

The draft frame F may be of any form suitable to support the other parts of the apparatus, and to provide an operative connection between the scoop S and any vehicle employed for dragging the scoop over the ground. The draft frame here illustrated comprises a pair of bars 24 bent to provide relatively short parallel portions 24$^c$ secured to each other by a plate 25, the latter having an eye 26 through which any suitable connection may be extended for connecting the frame to a tractor or other form of draft vehicle. From the parallel portions the bars are extended to form divergent portions 24$^b$ terminating in parallel portions 24$^a$ while a cross bar 27 rigidly connects the parallel portions 24$^a$, and from this cross bar a pair of bars 28 are extended so as to be interposed between the parallel portions 24$^c$.

Although the scoop S normally tends to rotate under forward movement of the apparatus by reason of the fact that the wheels W are in contact with the ground, the movements of the scoop about the stub shafts 21 as a center are adapted to be controlled manually by the operator of the apparatus in order to secure various adjustments of the scoop to perform predetermined functions in respect to the ground over which it moves incident to leveling of the ground or forming borders. To control movements of the scoop, I provide an arcuate frame 29 secured to the scoop S medially of its ends. This frame is provided with two sets of perforations 30 for the reception of screw bolts 31 to secure a plurality of lugs upon the frame and in a manner to permit adjustment of the lugs longitudinally of the frame. In the present instance, I have shown three lugs 32, 33, and 34 arranged in staggered relation, as best illustrated in Fig. 1, so that the lugs 32 and 34 move in the same path when the scoop is rotated, while the lug 33 moves in a different path, as will be understood. The lugs 32 and 34 move in a path in which a latchlever 35 is normally interposed, while the lug 33 moves in a path in which a second latch lever 36 is normally interposed. Thus, the levers 35 and 36 through their engagement with the lugs 32, 34, and 33, respectively, are adapted to control rotation of the scoop S, and in such manner as to retain the scoop in predetermined adjustments or positions circumferentially. The precise adjustments of the scoop under the action of the lugs and latch levers will be explained and described in the operation of the entire apparatus.

The latch levers 35 and 36 are fulcrumed on a common pin 37, the latter being carried in the rearward end of a pair of bars 38 secured to the cross bar 27, and connected at their front ends by a cross strap 39, the latter in turn being secured to the bars 28. The levers 35 and 36 are provided with yokes 40 in which work rollers 41 carried by the lower ends of operating levers 42 and 43, respectively, for the latch levers 35 and 36. These operating levers are fulcrumed on a common pin 44 carried by a pair of brackets 45 secured to the bars 38 and to the cross strap 39. V-shaped yokes 46 are connected to the operating levers at points below the pin 44, and springs 47 are connected to the yokes and to a lip 48 upstanding from the cross strap 39. Through the medium of the springs 47, the operating levers are normally urged to a position in which the rollers 41 are at the forward ends of the yokes 40 so as to normally retain the latch levers 35 and 36 in latching position, that is, in a position in which they are interposed in the path of movement of the lugs 32, 33 and 34. In this position of the operating levers, the latch levers cannot swing upwardly or out of the path of movement of the lugs, by reason of the fact that the lower ends of the operating levers are disposed beyond or to the forward side of a vertical plane extending through the pivot 44, and consequently any tendency is restrained of upward movement of the forward ends of the latch levers. The precise normal position of the operating levers may be varied by means of set screws 49 threaded in the forward ends of the latch levers 35 and 36, these set screws extending into the yokes 40 so as to have engagement with the rollers 41. Thus, by an adjustment of the screws, the rollers may be moved to vary the position of the lower ends of the operating levers in respect to their fulcrum 44. In this manner the degree of movement of the operating levers to throw their lower ends beyond the fulcrum 44, and thus release the latch levers, can be varied at will.

The operating levers 42 and 43 are adapted to be manually actuated from the draft vehicle, that is, the vehicle which is pulling the apparatus, and to this end the upper ends of the operating levers have cables 50 connected thereto so that by pulling the cables forwardly the levers will be operated to release the latch levers, the operating levers being returned to normal position under the action of the springs 47.

Circumferential adjustment of the scoop S through the medium of the control mechanism just described, varies the position of the scraping blade 17 vertically and uniformly from end to end, but in an apparatus of this character, in order to successfully accomplish the leveling of ground, I find it desirable to adjust vertically one end or the other or both ends of the scraping blade and without varying the circumferentially adjusted position of the scoop. To effect these adjustments, I provide a pair of subsidiary wheels W' indirectly mounted on the outer ends of the shafts 21. As the mounting of each wheel W' is the same, a description of one will suffice for both.

As best shown in Fig. 5 the wheel W' is spoked and provided with a hub 51 rotatable on an eccentric 52 mounted directly and rotatably on the corresponding stub shaft 21 and confined thereon by means of a collar 53 through which a pin 54 extends. The hub 51 is confined on the eccentric by a collar 55 secured to the eccentric by a set screw 56. The inner end of the eccentric 52 is provided with a pair of radial arms 57 bifurcated to receive latches 58 pivoted at the points indicated at 59, and urged inwardly by means of springs 60 and to a position in which one or the other of the latches will engage the upper side of the corresponding parallel frame portion 24ª to secure the eccentric 52 against rotation. By means of a plate 61 either one latch 58 or the other can be cammed inwardly against the tension of the corresponding spring 60 to engage one of the spokes of the wheel W' so that under rotative movement of the latter, the eccentric 52 is caused to be rotated and for the purpose of lowering or elevating the wheel W'. The plate 61 is mounted for sliding movement on the frame portion 24ᵃ by a pin and slot connection 62, and operatively connected to this plate is a link 63 which extends forwardly where it is connected to an arm 64 on one end of a shaft 65, the latter being journaled in suitable bearings 66 and 67, respectively, to one of the diagonal frame portions 24 of the draft frame F, and to one of the bars 38. The mounting of the bearing 67 is best shown in Fig. 8, and as here shown that portion of the shaft 65 projecting from the bearing 67 has slidable thereon a sleeve 68 retained against displacement by a pin 69. The outer end of the sleeve 68 is provided with slots 70 to engage pins 71 on the confronting end of the shaft 65 of the other mechanism for actuating the latch plate 61 for the other wheel W'.

From this construction it will be understood that by sliding the sleeve 68 outwardly on the shaft end to engage the pins 71, the two shafts 65 will be operatively connected so that rotation of one shaft will effect corresponding movement of the other, and in consequence, both latch plates 61 will be actuated to move the latches 58 inwardly to engage the spokes of the wheels W'. Conversely, with the sleeve 68 in the normal position shown in Fig. 7, the two shafts 65 are disconnected so that they may be separately operated.

For operating each shaft 65, an arm 72 is fixed thereto and provided at its upper end with a cable 73 which extends forwardly so as to permit actuation thereof by the operator of the draft vehicle. Either latch plate 61 normally occupies the position shown in Fig. 5 under the action of a spring 74 connected to the draft frame and to the corresponding link 63 so as to normally rotate the shaft 65 rearwardly and thus position the arm 72, as illustrated in Fig. 6. It will thus be seen that by forward movement of the cable 73, the arm 72 is rocked forwardly to impart a corresponding movement to the link 63 and against the tension of the spring 74 so as to slide the plate 61 forwardly and thus cam either one latch 58 or the other to a position in which it engages one of the spokes of the wheel W'.

Normally, the wheel W' rotates by reason of the fact that it is in contact with the ground, and consequently, when one latch 58 or the other is moved by the latch plate to disengage the frame portion 24ᵃ and engage one of the spokes of the wheel, it is carried around by the wheel to effect rotation of the eccentric. Through the provision of an abutment plate 75 secured to and depending from the under side of the frame portion 24ᵃ, as best illustrated in Fig. 7, the latch 58 is held in engagement with one of the spokes of the wheel until the wheel has rotated a half a turn. Thus, the eccentric is rotated a corresponding distance so as to lower or elevate the wheel W' depending upon the position from which the eccentric was moved. For example, with the wheel W' in the elevated position shown in Figs. 5 and 6, the major diameter of the eccentric is uppermost, and when rotated forwardly a half a turn its major diameter is now positioned lowermost, thus moving the wheel W' downwardly to the dot and dash line position shown in Fig. 6. Following this operation, the other latch 58, which has been rotated with the eccentric, now occupies that position formerly occupied by the other latch, and in which position it engages the upper side of the frame portion 24ᵃ to prevent further rotation of the eccentric, and in consequence of which, the wheel W' remains in lowered position.

If it is desired to restore the wheel W' to elevated position, it is only necessary to move the other latch 58 now engaging the frame portion 24ᵃ, when it will have operative engagement with the wheel to rotate the eccentric a half a turn, and thus move the wheel W' to lowered position.

From the foregoing, it should be apparent that by operation of one arm 72 or the other one, one wheel W' or the other can be lowered or elevated, and in consequence of which one end or the other of the scoop is lowered or elevated to produce a vertical adjustment of one end or the other of the scraping blade 17 without varying its position circumferentially. Further, by moving the sleeve 68 to operatively connect the two shafts 65, operation of either arm 72 will effect operation of both shafts 65, and in consequence both eccentrics 52 are rotated to either lower or elevate both of the wheels W', and thereby vertically adjust the scraping blade 17 without disturbing its circumferential position of adjustment.

The operation of the apparatus is as follows:

With the draft frame F attached to a tractor or other vehicle, the scoop S of the main wheels W which is in contact with the ground, is drawn forwardly and through the traction produced by the wheels W, the tendency of the scoop is to rotate forwardly. Normally, however, the scoop is adapted to be held against rotation and in various positions of adjustment circumferentially in order to perform the functions for which it is intended, and in the desired sequence necessary to the most effective leveling of a plot of ground, although it is to be understood that I do not desire to be restricted or limited to this precise sequence of operation, as it will be apparent that varying conditions of the ground may require a departure from this mode of operation.

The first position of adjustment is illustrated in Fig. 2, wherein the latch lever 35 is engaged by the lug 32 to retain the scoop in an earth scraping and collecting position. Thus, it will be apparent, that under forward movement of the scoop, the blade 17 which has scraping contact with the ground, will loosen the earth in advance of the scoop, and by reason of the inclination of the scoop the earth will accumulate at the forward side thereof. Thus, earth scraped from the ground and accumulated at the forward side of the scoop, may be conveyed forwardly and subsequently deposited on a lower portion of the ground for the purpose of leveling.

The earth accumulated and conveyed as just described, can be distributed by moving the scoop S to the position shown in Fig. 3. This new adjustment of the scoop is effected by swinging the latch lever 35 to the position shown in Fig. 3, in which it disengages the lug 32 to allow forward rotation of the scoop until the lug 33 engages the latch lever 36. In this position of adjustment, the scoop functions to discharge a portion of the earth previously collected and to retain the remaining portion, the blade 17 being slightly spaced from the surface of the ground in order to allow earth to escape therebeneath in effecting a distribution of the earth over the ground as the scoop proceeds forwardly. In this position of the scoop, it may be employed to collect earth in advance thereof, and particularly relatively high mounds of earth, in order that such portions of earth may be advanced to fill depressions or low areas in the plot of ground over which the apparatus is working.

The third and final position of adjustment of the scoop S, is illustrated in Fig. 4, and this position of adjustment is defined by the latch lever 35 engaging the lug 34. In this position, the scoop functions to distribute all earth collected under its forward movement, and also all earth collected as a result of occupying either of the positions shown in Figs. 2 and 3. The blade 17 of the scoop is now elevated to such a position as to allow the earth collected to pass beneath the scoop, as the latter is drawn forwardly, and to thereby effect an even distribution of the earth collected over the surface of the ground for the purpose of leveling the ground. It will be understood that in this position of adjustment, all earth previously collected by the scoop is discharged rearwardly thereof as the scoop is advanced.

Should it be desired to effect an instantaneous discharge of all earth collected by the scoop in order to fill a particular area of ground, both latch levers 35 and 36 may be simultaneously removed to a released position, thereby allowing the scoop to completely rotate so as to invert the forward side of the scoop and to thus discharge downwardly all earth in advance of the scoop. With the scoop released to freely rotate, it does not function to collect any earth, and in this inoperative position the scoop may be freely moved over the ground incident to moving the apparatus from one area of ground to another. In the first or second position of adjustment of the scoop as herein described, it may be desirable to elevate the blade 17 in order to cause the blade to escape certain portions of the ground or to permit gradual distribution or discharge of the earth collected. To accomplish these functions, the entire blade is elevated, through actuation of the eccentrics 52, to lower the wheels W' to the dot and dash line position shown in Fig. 6 from the solid line position. Should the shafts 65 be operatively connected by the sleeve 68, such elevation of the blade may be effected by operating either of the arms 72, or in the event that they are not operatively connected, operation of both arms 72 will be necessary.

Should it be desired to elevate one end or the other of the blade 17, where it is necessary to scrape the earth for only a portion of the length of the blade to remove a high spot and not accumulate earth from a low spot, the blade may be adjusted accordingly by elevating one wheel W' or the other through operation of the corresponding arm 72.

In the formation of borders, the apparatus may be operated to collect earth from a field and deposit it at one edge of the field to form the borders. In this use of the apparatus, the scoop is adjusted to occupy either the position shown in Fig. 2, or that shown in Fig. 3, so as to accumulate earth in advance thereof, and when the scoop reaches the edge of the field, it may be released completely to discharge all accumulated earth to form the borders, the apparatus being free to pass over the borders by reason of the free rotation of the scoop.

Although I have herein shown and described only one form of apparatus for leveling land and forming borders embodying my invention, it is to be understood that various changes and modifications may be made herein without departing from the spirit of the invention and the spirit and scope of the appended claims.

I claim:

1. An apparatus of the character described, comprising a draft frame, shafts on the frame, a scoop on the shafts, eccentrics rotatable on the shafts, wheels rotatable on the eccentrics, means on the eccentrics normally acting in cooperation with the frame to secure the eccentrics in one position of adjustment circumferentially for maintaining the wheels in a fixed position of adjustment vertically, and means on the frame for actuating the first means to cause the eccentrics to change their position of adjustment for changing the vertical adjustment of the wheels.

2. An apparatus as embodied in claim 1 wherein, the actuating means comprises two mechanisms one for each of the eccentrics and operable independently of each other whereby, a vertical adjustment of either or both wheels may be effected.

3. An apparatus as embodied in claim 1 wherein, the actuating means comprises two mechanisms one for each of the eccentrics for independent operation thereof, and means correlated to the two mechanisms for operatively connecting the two so that the operation of one mechanism effects operation of the other.

4. In an apparatus of the character described, a draft frame, a shaft journaled on the frame, a scoop carried by the shaft, an eccentric rotatable on the shaft, a spoked wheel rotatable on the eccentric, means on the eccentric normally engaging the frame to hold the eccentric in a fixed position of adjustment circumferentially, and means for actuating the last means to engage one of the spokes of the wheel so that under rotative movement of the wheel a new adjustment of the eccentric is effected to vary the vertical position of the wheel.

5. In an apparatus of the character described, a frame, a shaft journaled on the frame, a scoop carried by the shaft, an eccentric rotatable on the shaft, a spoked wheel rotatable on the eccentric, a pair of arms carried by the eccentric, a pair of spring pressed latches carried by the arms and normally positioned so that one or the other engages the frame to secure the eccentric in a fixed circumferential position of adjustment, a member for moving the latches free of the frame to release the eccentric and to engage the spokes of said wheel so that under rotative movement of the wheel the eccentric will be rotated to a new position of adjustment, and means on the frame for retaining the latches in engagement with the spokes for only a predetermined degree of rotation of the wheel, whereby a predetermined adjustment of the eccentric is effected.

6. An apparatus of the character described, comprising a draft frame, a scoop, means for so supporting the scoop on the frame that it can be rotated under forward movement of the frame, and means for controlling rotative movement of the scoop so that it can be held in various circumferential positions of adjustment, said controlling means comprising a frame secured to the scoop and rotatable therewith, lugs on the frame staggered and circumferentially spaced, latch bars pivoted on the first frame and normally disposed so that one bar is in the path of movement of certain of the lugs and the other in the path of movement of the remaining lugs, and levers on the first frame operable to secure the latch bars in normal position and to move the latch bars to a released position for allowing the lugs to pass and thus permit rotation of the scoop.

7. An apparatus as embodied in claim 6 wherein the levers are fulcrumed above and at one side of the pivots of the latch bars, and pin and slot connections are provided between the levers and bars, the pins being at the opposite side of the lever fulcrums from the bar pivots when the bars are in normal position.

SAMUEL F. WEBB.